United States Patent
Belt et al.

(10) Patent No.: US 6,774,934 B1
(45) Date of Patent: Aug. 10, 2004

(54) SIGNAL LOCALIZATION ARRANGEMENT

(75) Inventors: Harm J. W. Belt, Eindhoven (NL); Cornelis P. Janse, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/436,193

(22) Filed: Nov. 8, 1999

(30) Foreign Application Priority Data

Nov. 11, 1998 (EP) ............................................. 98203802

(51) Int. Cl.[7] ............................................. H04N 5/232
(52) U.S. Cl. ..................................... 348/211.1; 381/92
(58) Field of Search ........................... 348/14.05, 14.09, 348/211.1; 381/92, 94

(56) References Cited

U.S. PATENT DOCUMENTS

| | | | | |
|---|---|---|---|---|
| 3,601,530 | A | * 8/1971 | Edson et al. .................. | 348/14.1 |
| 4,536,887 | A | * 8/1985 | Kaneda et al. ................. | 381/92 |
| 5,465,302 | A | * 11/1995 | Lazzari et al. ................. | 381/92 |
| 5,686,957 | A | * 11/1997 | Baker .......................... | 348/36 |
| 5,737,431 | A | * 4/1998 | Brandstein et al. ............ | 381/92 |
| 6,469,732 | B1 | * 10/2002 | Chang et al. ............ | 348/14.09 |
| 6,483,923 | B1 | * 11/2002 | Marash ........................ | 381/92 |
| 6,618,485 | B1 | * 9/2003 | Matsuo ......................... | 381/92 |

FOREIGN PATENT DOCUMENTS

EP 0615387 A1 9/1994 ............. H04N/7/14

OTHER PUBLICATIONS

"Voice Source Localization for Automatic Camera Pointing System in Videoconferencing" by Hong Wang and Peter Chu, IEEE, ASSP Workshop on Applications of Signal Processing to Audio and Acoustics, 1997.

* cited by examiner

*Primary Examiner*—Ngoc-Yen Vu
*Assistant Examiner*—Jacqueline Wilson

(57) ABSTRACT

In a video conferencing system, camera position means are used to point the camera to a speaking person. To find the correct direction for the camera, a system is required that determines the position from which the sound is transmitted. This can be done by using at least two microphones receiving the speech signal. By measuring the transmission delay between the signals received by the microphones, the position of the speaker can be determined. According to the present invention, the delay is determined by first determining the impulse responses ($h_1$) and ($h_2$) and subsequently calculating a cross correlation function between the impulse responses ($h_1$) and ($h_2$). From the main peak in the cross correlation function, the delay value is determined.

8 Claims, 9 Drawing Sheets

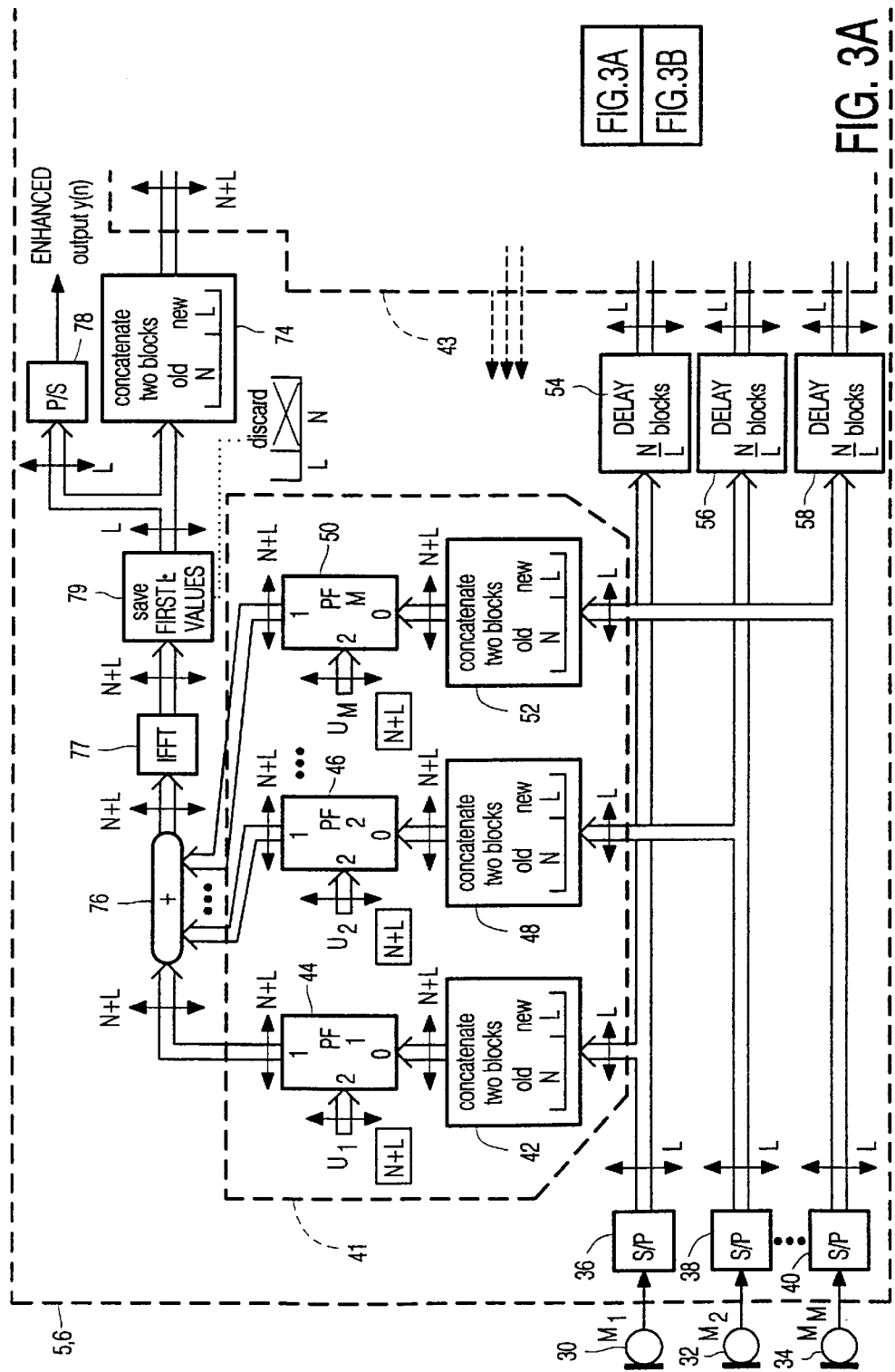

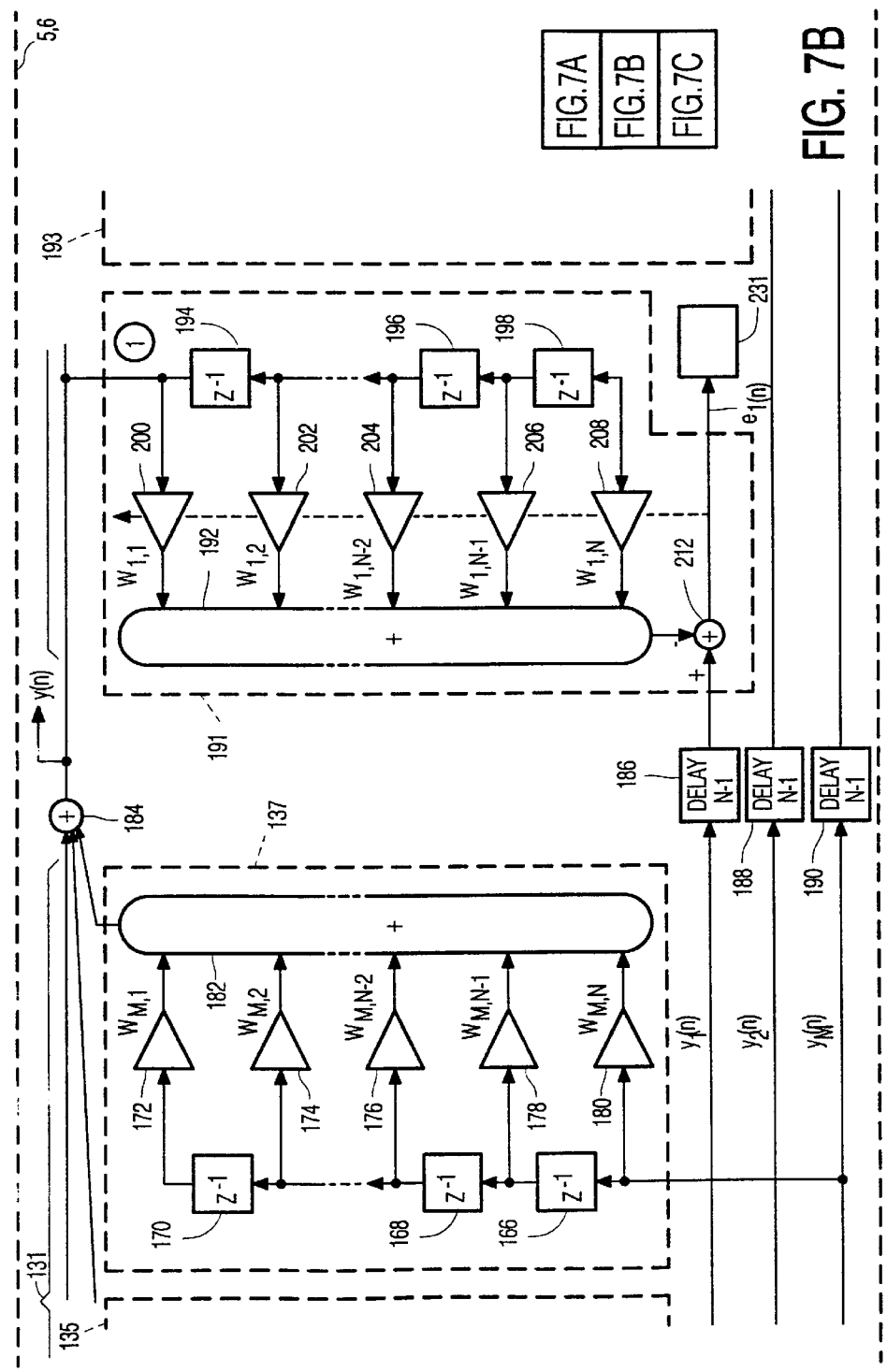

SIGNAL LOCALIZATION ARRANGEMENT

BACKGROUND OF THE INVENTION

The present invention relates to a signal source localization arrangement comprising a plurality of receivers having different positions, the signal source localization arrangement comprising delay estimation means for estimating a delay difference between the signals received by at least two receivers, and position determining means for determining from the delay difference a signal source location.

The present invention relates also to a delay estimation arrangement, a video communication system and a signal source localization method.
An arrangement according to the preamble is known from the article "Voice source localization for automatic camera pointing system in videoconferencing" by Hong Wang and Peter Chu in IEEE, ASSP workshop on applications of signal processing to audio and acoustics, 1997.

Signal localization arrangements are used in several applications. A first example of such applications is automatic camera pointing in video conferencing systems or in security systems. Another application is the determination of the position of a user of an audio system, in order to be able to optimize the reproduction of the audio at said position.

Signal localization arrangements using a plurality of receivers are often based on the determination of a delay difference between the signals at the outputs of the receivers. If the position of the receivers and a delay difference between the propagation paths between the source and the different receivers are known, the position of the source can be determined. If two receivers are used, it is possible to determine the direction with respect to the baseline between the receivers. If three receivers are used, it becomes possible to determine a position of the source in a 2-D plane. If more than 3 receivers, being not placed in a single plane, are used, it becomes possible to determine the position of a source in three dimensions.

In the prior art signal localization arrangements, the delay difference is determined by calculating a cross-correlation function between the signals received by the different receivers. The delay difference is then equal to the delay value in the cross-correlation function at which the highest correlation value occurs.

A problem with the prior art signal localization arrangement is that its operation depends heavily on the properties of the signal generated by the source. Especially voiced speech signals in a reverberant environment can disturb the operation. To reduce this large influence of the signal properties, a long averaging time has to be used in determining the cross-correlation function of the received signals.

SUMMARY OF THE INVENTION

The object of the present invention is to provide a signal localization arrangement in which the adverse influence of the signal properties has been reduced.

To achieve said purpose, the signal localization arrangement is characterized in that the signal source localization arrangement comprises impulse response determining means for determining a plurality of functions representing the impulse responses of the paths between the signal source and the receivers, and in that the delay estimation means are arranged for determining the delay difference from said functions.

A function representing the impulse response is a function that represents an important aspect of the impulse response, but it may differ substantially in other aspects from the real impulse response of the paths between signal sources and receivers.

By determining the delay difference from functions representing the impulse responses of the paths between the signal source and the receivers instead of from the received signals themselves, the influence of the properties of the signals on the determination of the delay difference is strongly reduced. Experiments have shown that the averaging time to be used in the determination of the delay difference can be strongly reduced.

Preferably, the delay difference is determined by calculating a cross correlation function of the functions representing the impulse responses.

An embodiment of the invention is characterized in that the impulse response determining means comprise adjustable filters for deriving filtered signals from the signals provided by the receivers, the signal source localization arrangement comprising combining means for deriving a combined signal from the filtered signals, in that the impulse response determining means comprises control means for controlling the adjustable filters in order to maximize a power measure of the combined signal, and in that the control means are arranged for limiting a combined power gain measure of the filtered audio signals to a predetermined value.

By combining a plurality of filtered signals and adjusting the filters for maximizing a power of the combined signal under the constraint of a limited combined power gain measure, it is obtained that the filters converge to a transfer function leading to filtered signals having a maximum degree of coherence before they are added. This means that the delay differences between the impulse responses of the adjustable filters correspond to the delay difference between the signals at the outputs of the receivers.

A further embodiment of the invention is characterized in that the control means comprise a plurality of further adjustable filters having a transfer function being the conjugate of the transfer function of the adjustable filters, said further adjustable filters being arranged for deriving from the combined audio signal filtered combined audio signals, and in that the control means are arranged for maximizing the power measure of the combined audio signal, and for restricting a combined power gain measure of the processed audio signals to a predetermined value by controlling the transfer functions of the adjustable filters and the further adjustable filters in order to minimize a difference measure between the input audio signals and the filtered combined audio signal corresponding to said input audio signals.

Experiments have shown that by using two sets of adjustable filters, the quality of the speech signal can be further enhanced. By minimizing a difference measure between the input audio signal and the corresponding filtered combined audio signal, it is obtained that a power measure of the combined audio signal is maximized under the constraint that per frequency component the sum of the power gains of the adjustable filters is equal to a predetermined constant. The correspondence between the two criteria mentioned above will be shown in the detailed description of the drawings by using a simplified example.

BRIEF DESCRIPTION OF THE DRAWING

The present invention will now be explained with reference to the drawings.

DESCRIPTION OF THE PREFERRED EMBODIMENTS

Figure 1:
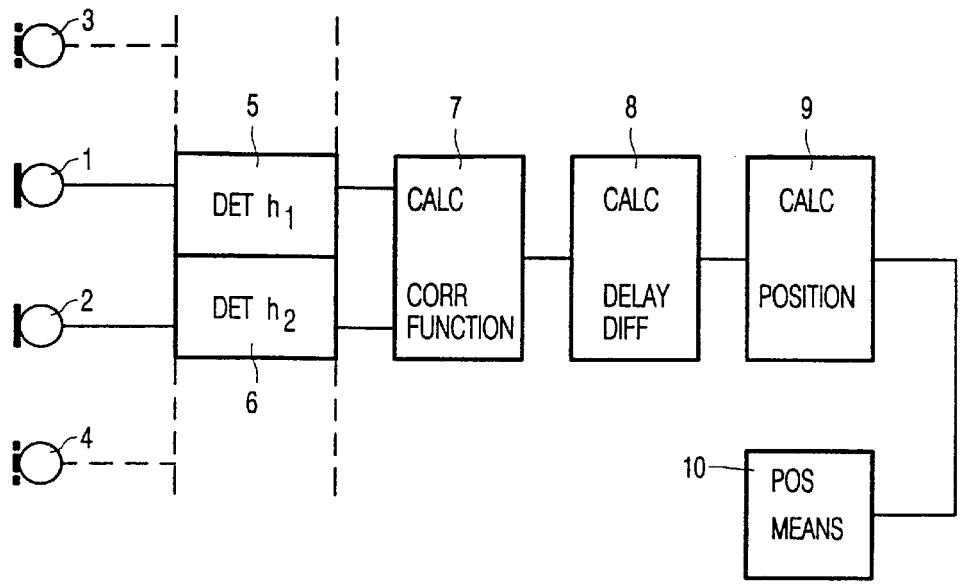
FIG. 1 shows a block diagram of a video communication system using a signal source localization means according to the invention.

In the video communication system according to FIG. 1 a microphone 1 is connected to impulse response determining means 5, and a microphone 2 is connected to impulse response determining means 6. Additional microphones 3 and 4 can be added to corresponding impulse response determining means in order to be able to determine, besides the direction, the exact position of the signal source in two or three dimensions. The impulse response determining means 5 and 6 determine a function representing the impulse response from the signal source to the respective microphones.

The outputs of the impulse response determining means 5 and 6, carrying the functions representing the impulse responses, are connected to inputs of correlation calculation means 7.

If the impulse response determining means 5 and 6 operate in the frequency domain, they will provide Fourier transforms $W_1^*$ and $W_2^*$ of the estimates of the impulse responses $h_1$ and $h_2$. The crosscorrelation function can now be easily determined by first determining the cross power spectrum according to $$\Phi_{w1,w2}(f) = W_1 \cdot W_2^* \tag{1}$$

In (1) $W_2$ is the complex conjugate of the function $W_2^*$ provided by the impulse response determining means. From the function $\Phi w_1, w_2$ (f) the cross-correlation function $\rho w_1, w_2$ (k) can be determined by performing an IFFT on the function In the impulse response determining means 5 and 6 operate in the time domain, the functions $h_1$ and $h_2$ will be provided by these impulse response determining means. In that case, the cross-correlation function $\rho w_1, w_2$ (k) can be calculated according to:

$$\rho_{w_1 w_2}(k) = \sum_{n=0}^{n=N} h_1(k) \cdot h_2(n-k); \quad k = 0, 1, \cdots, N-1 \tag{2}$$

$$\rho_{w_1 w_2}(k) = \sum_{n=-k}^{N-1} h_1(k) \cdot h_2(n-k); \quad k = -(N-1), \cdots, -1$$

In (2) N is the length of $h_1$ and $h_2$.

After the function $\rho w_1, w_2$ (k) has been determined, the resolution of this function can be improved by upsampling the function $\rho w_1, w_2$ (k) by introducing samples with value zero between the non-zero samples, followed by an interpolation. Useful interpolation factors are in the range from 4 to 8.

The (upsampled and interpolated) cross correlation function is passed by the correlation function determining means 7 to delay difference calculating means 8. These delay difference calculation means 8 determine the value of k having the largest correlation value. The corresponding delay difference $\Delta$ is then equal to $k \cdot T_s$ in which $T_s$ is the sampling period.

The output of the delay calculating means 8 is connected to the input of position calculating means. If two receivers are used, the direction $\theta$ defined as the angle between the connection line between the receivers and the direction of the source can be calculated according to:

$$\theta = \arccos\left(\frac{c \cdot k \cdot T_s}{d}\right) \tag{3}$$

In (3) c is the propagation speed of the signal to be received and d is the distance between the receivers. A signal representing the angle $\theta$ is passed to camera positioning means 10 which rotates the position of the camera over an angle $\theta$ with respect to the baseline between the receivers 1 and 2.

Figure 2:
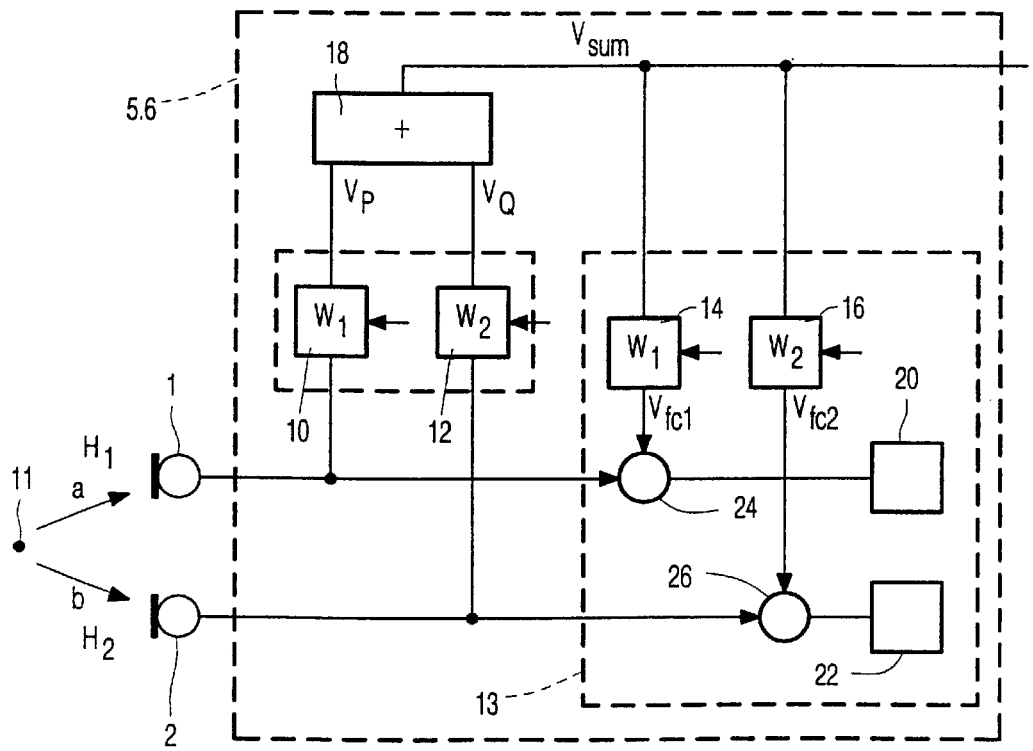
FIG. 2 shows a general block diagram of impulse response determining means according to the present invention.

In the impulse response determining means according to FIG. 2, an output of a first receiver, being here a microphone 1, is connected to a first input of the impulse response determining means 5,6 and an output of a second receiver, being here a microphone 2, is connected to a second input of the impulse response determining means 5,6.

If it is assumed that the microphones 4 and 6 receive a signal $V_{IN}$ via propagation paths with impulse responses $H_1$ and $H_2$ respectively, the output signal of microphone 1 is equal $H_1 \cdot V_{IN}$ and the output signal of microphone 2 is equal to $H_2 \cdot V_{IN}$. The output of the microphone 1 is connected to an input of a filter 10 with transfer function $W_1$, and the output of the microphone 2 is connected to an input of a filter 12 with transfer function $W_2$. At the output of the filters 10 and 12 the processed signals $V_P$ and $V_Q$ are available. For these processed signals can be written:

$$V_P = H_1 \cdot W_1 \cdot V_{IN} \tag{4}$$

and $$V_Q = H_2 \cdot W_2 \cdot V_{IN} \tag{5}$$

At the output of the combination means 18 the sum $V_{SUM}$ of the processed signals $V_P$ and $V_Q$ is available. This signal $V_{SUM}$ is equal to:

$$V_{SUM} = (H_1 \cdot W_1 + H_2 \cdot W_2) V_{IN} \tag{6}$$

The output of the adder 18 is connected to the input of two further adjustable filters 14 and 16. The further adjustable filters 14 and 16 derive filtered combined signals from the combined signal using transfer functions $W_1^*$ and $W_2^*$. The first filtered combined signal is equal to $$V_{FC1} = (H_1 \cdot W_1 + H_2 \cdot W_2) \cdot W_1^* \cdot V_{IN} \tag{7}$$

and the second filtered combined signal is equal to:

$$V_{FC2} = (H_1 \cdot W_1 + H_2 \cdot W_2) \cdot W_2^* \cdot V_{IN} \tag{8}$$

A first difference measure between the first input audio signal and the first filtered combined audio signal is determined by a subtractor 24. For the output signal of the subtractor 24 can be written:

$$V_{DIFF1} = \{H_1 - (H_1 \cdot W_1 + H_2 \cdot W_2) \cdot W_1^*\} \cdot V_{IN} \quad (9)$$

A second difference measure between the second input audio signal and the second scaled combined audio signal is determined by a subtractor 26. For the output signal of the subtractor 26 can be written:

$$V_{DIFF2} = \{H_2 - (H_1 \cdot W_1 + H_2 \cdot W_2) \cdot W_2^*\} \cdot V_{IN} \quad (10)$$

The arrangement according to FIG. 2 comprises a control element 20 for adjusting the coefficients of filter 10 and 14 to make the power of the output signal of $V_{DIFF1}$ of the subtractor 24 equal to 0. The arrangement further comprises a control element 22 for adjusting the coefficients of filter 12 and 16 to make the power of the output signal $V_{DIFF2}$ of the subtractor 26 equal to 0. In order to find the values for x and y to make both difference signals equal to 0, the following set of equations has to be solved:

$$(H_1 \cdot W_1 + H_2 \cdot W_2) \cdot W_1^* = H_1 \quad (11)$$

$$(H_1 \cdot W_1 + H_2 \cdot W_2) \cdot W_2^* = H_2 \quad (12)$$

Eliminating the term $(H_1 \cdot W_1 + H_2 \cdot W_2)$ from (11) and (12) by dividing (11) by (12) results in:

$$\frac{W_1^*}{W_2^*} = \frac{H_1}{H_2} \Rightarrow W_1^* = \frac{H_1 \cdot W_2^*}{H_2} \quad (13)$$

By conjugating the left-hand side and the right-hand side of (13) for $W_1$ can be written:

$$\frac{W_1}{W_2} = \frac{H_1^*}{H_2^*} \Rightarrow W_1 = \frac{H_1^* \cdot W_2}{H_2^*} \quad (14)$$

Substituting (14) into (12) gives the following expression:

$$\left(\frac{|H_1|^2 \cdot W_2}{H_2^*} + H_2 \cdot W_2\right) \cdot W_2^* = H_2 \quad (15)$$

Rearranging (15) gives for $|W_2|^2$:

$$|W_2|^2 = \frac{|H_2|^2}{|H_1|^2 + |H_2|^2} \quad (16)$$

For $|W_1|^2$ can be found in the same way:

$$|W_1|^2 = \frac{|H_1|^2}{|H_1|^2 + |H_2|^2} \quad (17)$$

From (16) and (17) it is clear that the value of $|W_1|^2$ increases when $|H_1|^2$ increases (or $|H_2|^2$ decreases) and that the value of $|W_2|^2$ increases when $|H_2|^2$ increases (or $|H_1|^2$ decreases). In such a way the strongest input signal is pronounced. This is of use to enhance a speech signal of a speaker over background noise and reverberant components of the speech signal without needing to know the frequency dependence of the paths from the speaker to the microphones as was needed in the prior art arrangement.

Below will be demonstrated that maximizing the power of the combined audio signal under the constraint that the sum of the power gains of the processing means is limited, results in the same values for $|H_1|^2$ and $|H_2|^2$ as making the output signals of the subtractors 24 and 26 equal to 0.

For the power measure $P_{SUM}$ of the combined audio signal $V_{SUM}$ can be written:

$$P_{SUM} = V_{SUM}^2 = |H_1 \cdot W_1 + H_2 \cdot W_2|^2 \cdot V_{IN}^2 \quad (18)$$

For the boundary condition that the sum of the power gains of the scaling means is limited to a constant value can be stated:

$$G^P = |W_1|^2 + |W_2|^2 = 1 \quad (19)$$

Consequently, the term $|H_1 \cdot W_1 + H_2 \cdot W_2|^2$ has to be maximized under the boundary condition $|W_1|^2 + |W_2|^2 - 1 = 0$. This can be done by using the well-known Lagrange multiplier method. According to said method, the following expression has to be maximized:

$$(|H_1 \cdot W_1 + H_2 \cdot W_2|^2 + \lambda \cdot (|H_1|^2 + |H_2|^2 - 1)) \quad (20)$$

Differentiating (20) with respect to $\mathrm{Re}\{W_1\}$, $\mathrm{Jm}\{W_1\}$, $\mathrm{Re}\{W_2\}$ and $\mathrm{Jm}\{W_1\}$ and setting the derivatives to zero gives four equations with four variables. By solving these equations, and calculating the values of $|W_1|^2$ and $|W_2|^2$ (16) and (17) are found. Consequently it is clear that controlling $W_1$ and $W_2$ to make the difference signals equal to 0 is equivalent to maximizing the power of the combined signal under the boundary condition that the sum of the power gains of the different branches of the processing means is limited to a maximum value. The above can easily be generalized for N input signals each having a transfer factor $H_i$ with $1 \leq i \leq N$. If it assumed that the processing means have N branches each corresponding to a signal i and having a power transfer factor $|W_i|^2$, for these values of $|W_i|^2$ can be written:

$$|W_i|^2 = \frac{|H_i|^2}{\sum_{i=1}^{N} |H_i|^2} \quad (21)$$

It is observed that in general it is not possible to make the output signals of the subtractors exactly equal to zero, because the impulse response of the transmission paths cannot exactly be modeled by commonly used digital filters with reasonable complexity. In practice, the power of the output signals of the subtractors averaged over a given period in minimized. This way of operating the adaptive filters has turned out to be effective. In the present implementation, the functions representing the impulse response have the property that the differences of their phases is equal to the differences of the phases in the impulse responses of the transmission paths from the signal source to the receivers. This is one possibility for functions representing the impulse reponse of the transmission paths, but it is obvious that different functions could be used.

Figure 3B:
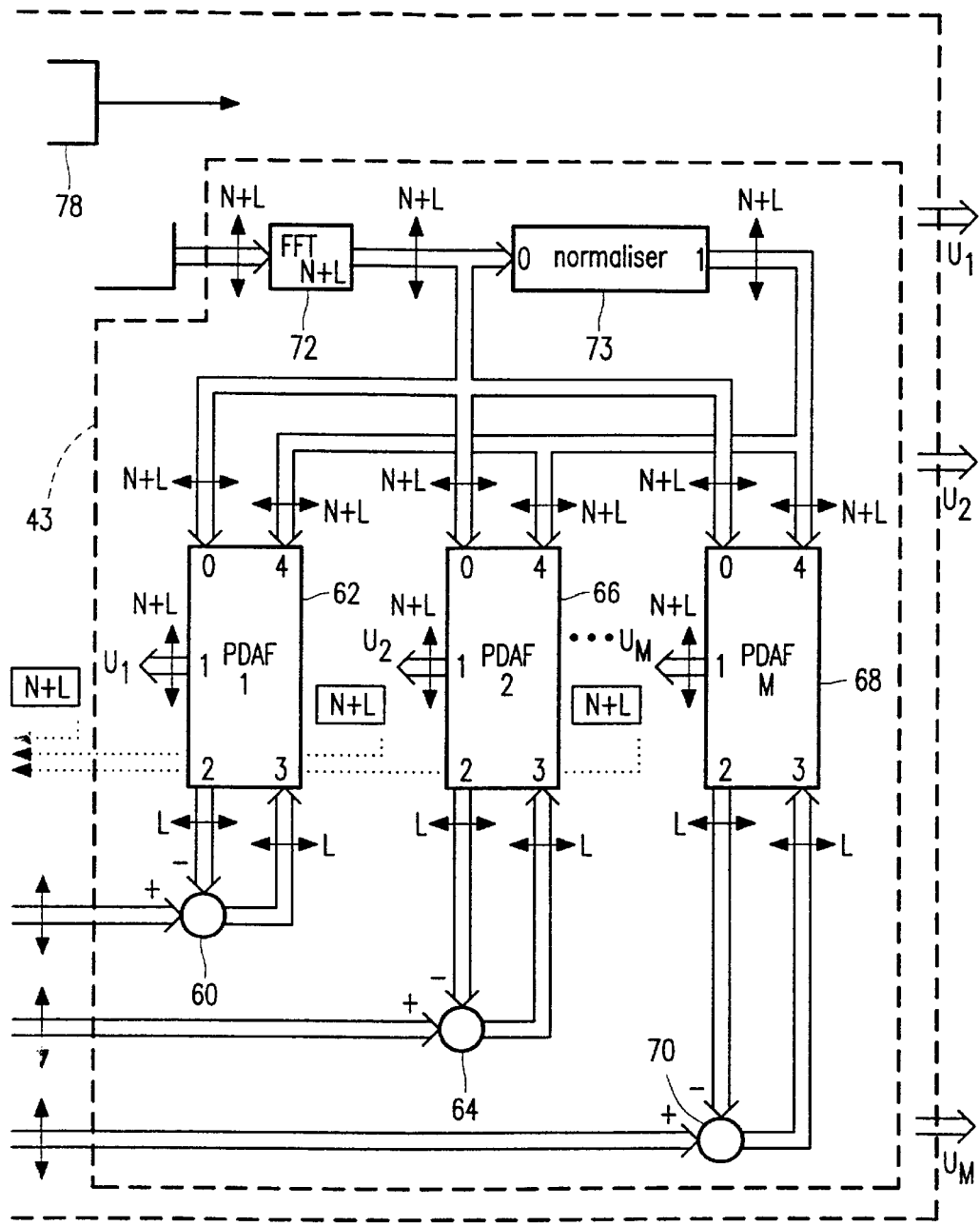
FIG. 3 shows a more detailed impulse response determining means according to the invention in which frequency domain adaptive and frequency domain programmable filters are used.

In the impulse response determining means 5,6 to FIG. 3, input signals from audio sources being here microphones 30, 32 and 34 are converted into digital signals which are converted into block of L samples by respective series to parallel converters 36, 38 and 40. The output of the series to parallel converters 36, 38 and 40 are connected to corresponding inputs of the processing means 41, and to input of respective block delay elements 54, 56 and 58.

In the processing means 41 the output signal of the series to parallel converter 36 is applied to a block concatenation unit 42. The block concatenating unit 42 constructs blocks of N+L samples from the present block of L samples and N samples from previous blocks of samples available at the output of the series to parallel converter 36. The output of the block concatenation unit 42 is connected to an input of a frequency domain programmable filter 44. The output of the frequency domain programmable filter 44, carrying a processed audio signal, is connected to a first input of the combining means being here an adder 76. The frequency domain programmable filter 44 presents blocks of N+L samples at its output.

In the same way the output signal of the series to parallel converter 38 is processed by a block concatenating unit 48 and a frequency domain programmable filter 46 and the output signal of the series to parallel converter 40 is processed by a block concatenating unit 52 and a frequency domain programmable filter 50. Outputs of the frequency domain programmable filters 46 and 50, carrying processed audio signals, are connected to corresponding inputs of the adder 76.

The output of the adder 76 is connected to an input of an IFFT unit 77 which determines an Inverse Fast Fourier Transformed signal from the output signal of the adder 76. The output of the IFFT unit 77 is connected to an input of a unit 79 which discards the last N samples of the N+L samples at the output of the IFFT unit 77.

The output signal of the unit 79 is converted into a serial stream of samples by the parallel to series converter 78. At the output of the parallel to series converter 78 the output signal of the audio processing arrangement is available. The output signal of the unit 79 is also applied to a block concatenating unit 74 which derives blocks of N+L samples from the present block of L samples at the output of the unit 79 and a block of N previous samples at the output of the unit 79. The output of the block concatenating unit 74 is connected to an input of an Fast Fourier Transformer 72 which calculates a N+L points FFT from the N+L samples at its input. The output signal of the Fast Fourier Transformer 72 represents the frequency spectrum of the combined signal. This frequency spectrum is applied to inputs of frequency domain adaptive filters 62, 66 and 68, and to an input of a normalizer 73. An output of the normalizer 73 is connected to inputs of the frequency domain adaptive filters 62, 66 and 68.

The output of the block delay element 54 is connected to a first input of a subtractor 60. The output of the block delay element 56 is connected to a first input of a subtractor 64 and the output of the block delay element 58 is connected to a first input of a subtractor 70. The block delay elements 54, 56 and 58 are present to compensate the delay to which the audio signals are subjected in the frequency domain programmable filters 44, 46.

An output of the frequency domain adaptive filter 62 is connected to a second input of the subtractor 60 and the output of the subtractor 60 is connected to a control input of the frequency domain adaptive filter. An output of the frequency domain adaptive filter 66 is connected to a second input of the subtractor 64 and the output of the subtractor 64 is connected to a control input of the frequency domain adaptive filter. An output of the frequency domain adaptive filter 68 is connected to a second input of the subtractor 70 and the output of the subtractor 70 is connected to a control input of the frequency domain adaptive filter.

The frequency domain adaptive filters 62, 66 and 68 are arranged to adjust their transfer function in order to minimize the power of the input signal at their control inputs. The frequency domain adaptive filters 62, 66 and 68 provide their N+L filter coefficients to the frequency domain programmable filters 44, 46 and 48. These frequency domain adaptive filters determine the conjugate value of the N+L filter coefficients before using them to filter the signals received from the block concatenating units 42, 48 and 52.

The functions representing the impulse response are here constituted by the sets of coefficients $U_1, U_2 \ldots U_M$ for the frequency domain programmable filters 44, 46 and 50.

Figure 4:
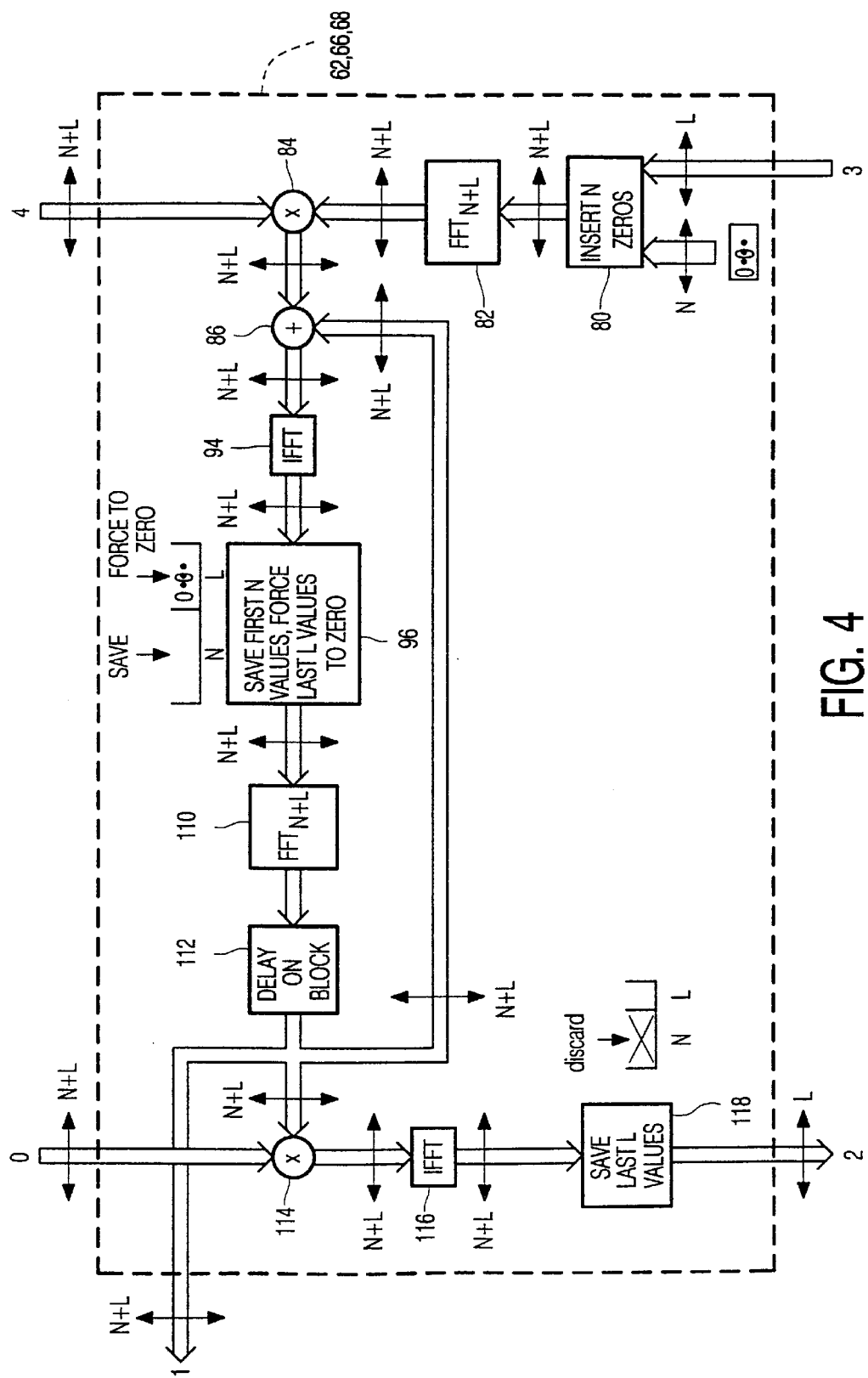
FIG. 4, shows an embodiment of the normalization means 73 used in the arrangement according to FIG. 2.
Figure 5:
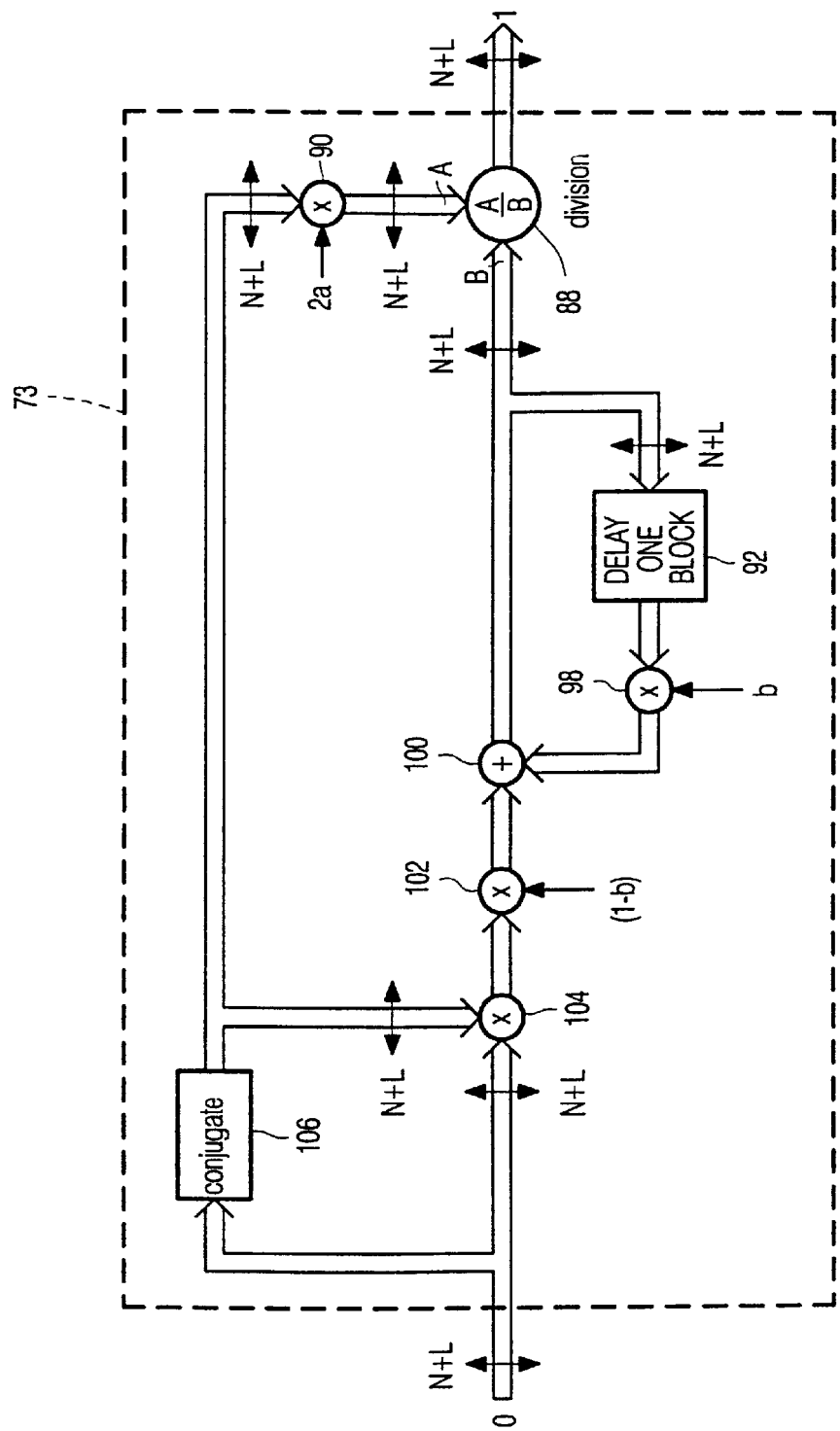
FIG. 5 shows an implementation of the frequency domain adaptive filters 62, 66 and 68 used in FIG. 3.

In the frequency domain adaptive filters 62, 66 and 68 according to FIG. 4, a padding element 80 combines the L samples available at the control input of the respective frequency domain adaptive filter with N samples having a value of 0 to a block of data having N+L samples. This block of N+L samples is subjected to a N+L points Fast Fourier Transform executed by a FFT element 82. The extension of blocks of L samples to blocks of N+L samples before executing the FFT is done to prevent distortion of the signal due to cyclic convolution effects. This measure is well known to those skilled in the art of (adaptive) digital filters.

At the output of the FFT element 82 the frequency spectrum of the signal at the control input of the frequency domain adaptive filter(=the output of the subtractor 60, 64 and 70 respectively) is available. The output signal of the FFT element 82 is multiplied with the output signal of the normalizer 73. The N+L components of the output signal of the normalizer 73 represents adaptation speed values determining the speed of adaptation of the coefficients of the frequency domain adaptive filter.

The output signal of the multiplier 84 is added to the output signal of a block delay element 112 by an adder 86. The output signal of the block delay element 112 represents the previous values of the filter coefficients of the frequency domain adaptive filter. The output signal of the adder 86 is subjected to an Inverse Fast Fourier Transform executed by an IFFT element 94. From the N+L output samples of the IFFT element 94, the value of the final L block is set to zero by the element 96. Subsequently the N+L samples (of which L samples are zero) are subjected to an FFT operation executed by an FFT element 110. The combination of the IFFT element 94, the element 96 and the FFT element 110 constitutes a "constrained" FDAF where a time domain constraint is put on the FDAF coefficients to prevent cyclic convolution effects.

The output of the FFT element 110 is connected to an input of the block delay element 112. At the output of the block delay element 112 N+L coefficients are available for use in the filter operation. These coefficients are also passed to the corresponding programmable filter. The combination of the adder 86, the IFFT element 94, the element 96, the FFT element 110 and the block delay element 112 determine the filter coefficient according to the following expression.

$$v_{i,k+1} = v_{i,k} + \lambda_{i,k} \cdot E_{i,k} \qquad (22)$$

In (22) $v_{i,k+1}$ represents the N+L filter coefficients at instant k+1, $v_{i,k}$ represents the N+L filter coefficients at instant $\lambda_{i,k}$ represents the adaptation coefficients provided by the normalizer 73 to the second input of the multiplier 84 and $E_{k,i}$ represents the frequency spectrum of the error signal at the output of the subtractor 60, 64 or 70 in FIG. 2.

In the normalizer 73 according to FIG. 4, the input signal provided by the FFT unit 72 in FIG. 2 a conjugating element 106 determines the conjugate value of said input signal. This conjugate value is multiplied with said input signal by a multiplier 104. At the output of the multiplier 104 the power spectrum of the input signal is available. The output of the multiplier 104 is connected to an input of a multiplier 102.

A low pass filter constituted by the multiplier 102, an adder 100, a multiplier 98 and a block delay element 92 determines a time average of the power spectrum of the input signal of the frequency domain adaptive filter as available at the output of the multiplier 104. A suitable value for b is:

$$b = 1 - \frac{20 \cdot L}{f_{sample}} \qquad (23)$$

In (23) $f_{sample}$ is the sample frequency with which the audio signals are sampled and processed. A value of 32 or 64 for L has proven to be a useful value when the sample rate is equal to 8 KHz. The output of the adder 100 carrying the time averaged power spectrum is connected to a first input of a divider 88. The output signal of the conjugating element 106 is scaled with a scaling factor 2a by a scaling element 90. A suitable value for a is 0.01. The output signal of the scaling element 90 is connected to a second input of the divider 88.

The divider 88 determines the values of $\lambda_{i,k}$ by calculating the ratio of the conjugated FFT transform (scaled with scaling factor 2a) of the input signal of the digital filter and the time averaged power spectrum of the input signal of the normalizer 73. The value of $\lambda_{i,k}$ increases proportional to the ratio between the $k^{th}$ component of the spectrum of the input signal and the $k^{th}$ component of the time averaged power spectrum. This results an adaptation speed that is the same for all frequency components irrespective of their strength.

Figure 6:
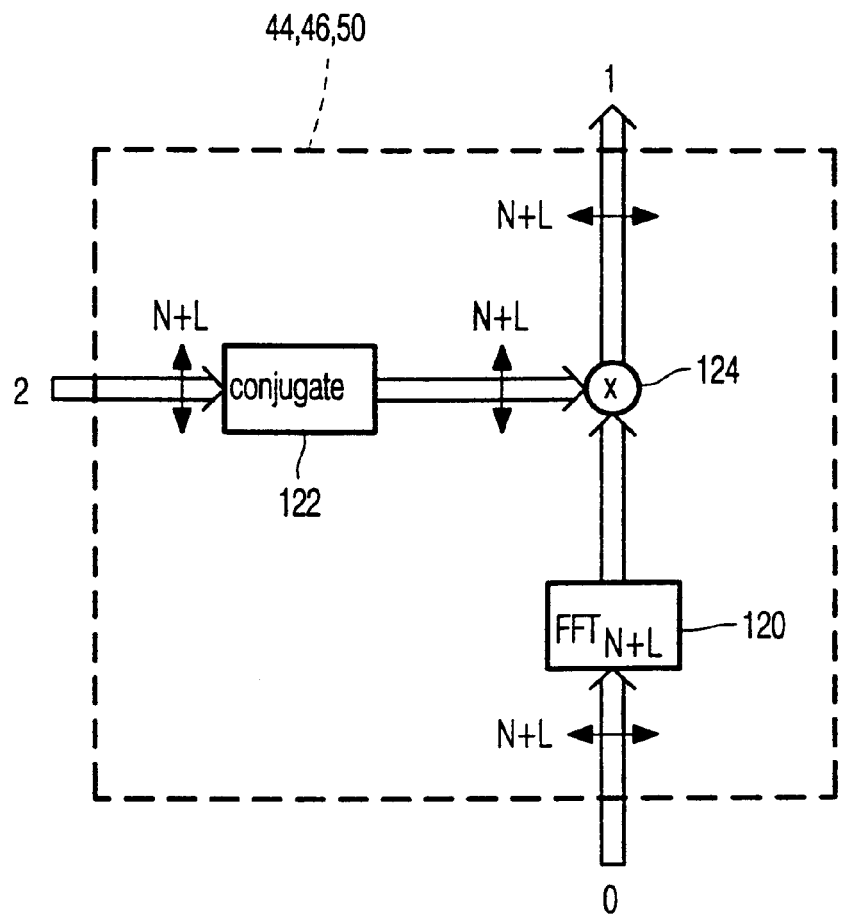
FIG. 6 shows an implementation of the frequency domain programmable filters 44, 46 and 50 used in FIG. 3.

In the frequency domain programmable filter 44, 46 and 50 according to FIG. 6, the input signal is applied to the input of an FFT element 120 which calculates a N+L points FFT from said input signal. A conjugating element 122 determines the conjugate value of the parameters received from the frequency domain adaptive filters 62, 66, 68. A multiplier 124 calculates a filtered signal by multiplying the FFT of the input signal with the conjugated filter coefficients received from the frequency domain adaptive filters.

It is observed that a suitable choice for N is making it equal to L, but it is also possible to choose N smaller or larger than L. It is desirable to make N+L equal to a power of two in order to enable an easy implementation of the FFT and IFFT operations.

Figure 7A:
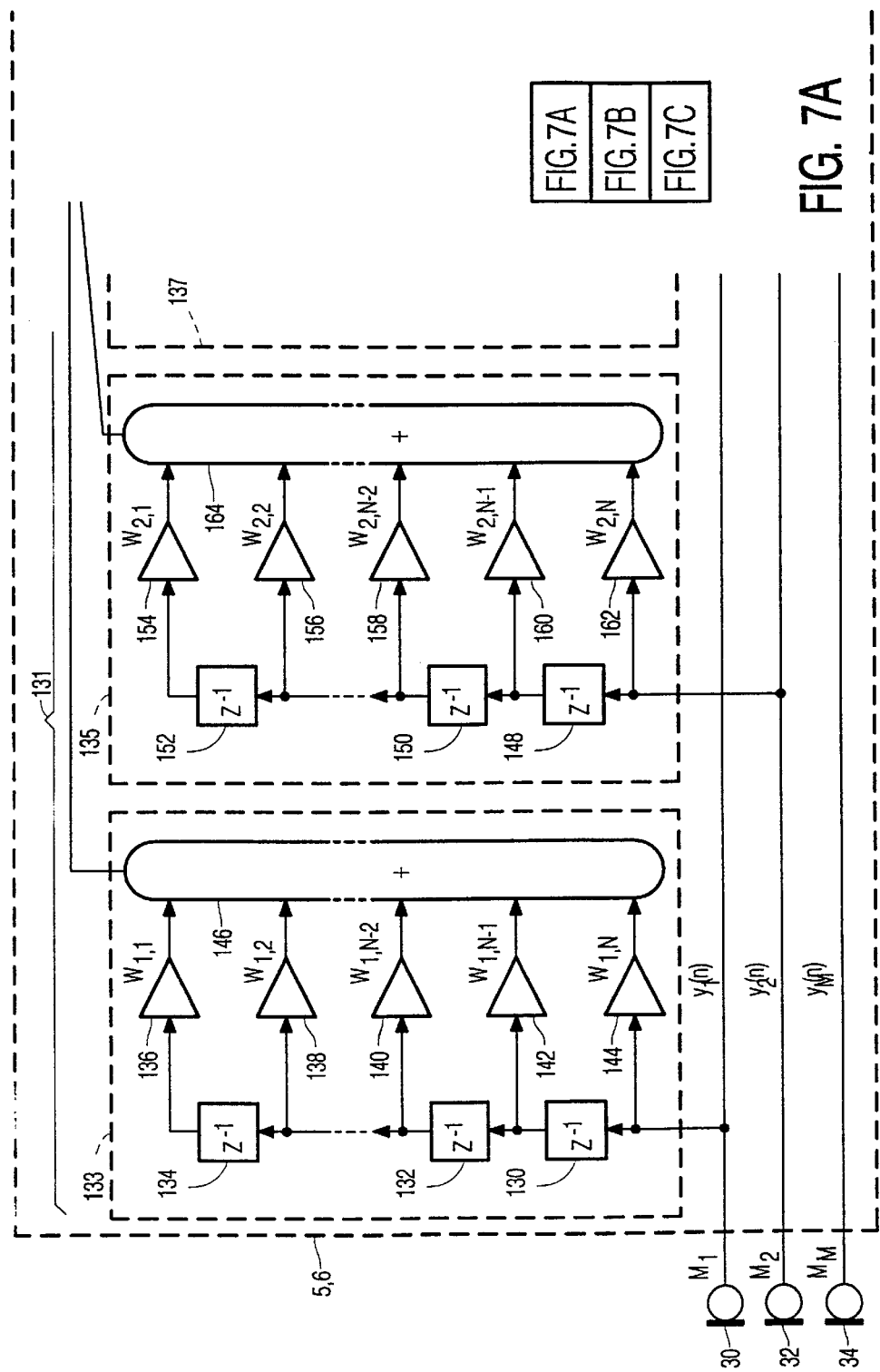
FIG. 7 shows an implementation of the impulse response determining means according to the invention in which time domain adaptive filters and time domain programmable filters are used.
Figure 7C:
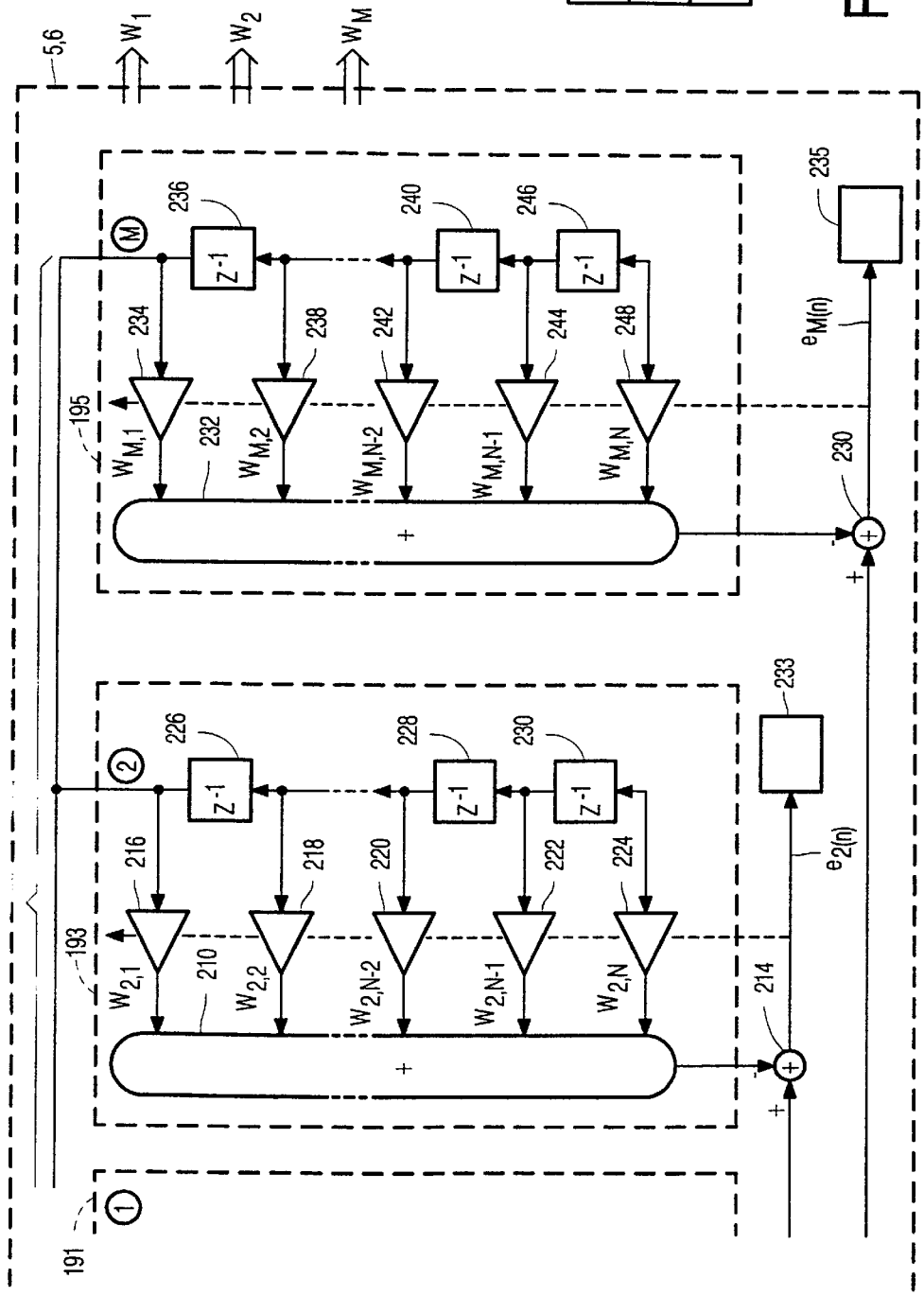

In the time domain implementation of the impulse response determining means according to FIG. 7 the outputs of microphones 30, 32 and 34 are connected to inputs of processing means 131 and to delay elements 186, 188 and 190. The processing means 131 comprise time domain programmable filters 133, 135 and 137.

The time domain programmable filter 133 comprises a plurality of cascaded delay elements 130, 132 and 134, and an adder 146 which adds the output signals of the delay elements weighted with a weighting factor $W_{1,1} \ldots W_{1,N}$. The weighting is performed by the weighting elements 136, 138, 140, 142 and 144. The time domain programmable filter 135 comprises a plurality of cascaded delay elements 148, 150 and 152, and an adder 164 which adds the output signals of the delay elements weighted with a weighting factor $W_{2,1} \ldots W_{2,N}$. The weighting is performed by the weighting elements 154, 156, 158, 160 and 162. The time domain programmable filter 137 comprises a plurality of cascaded delay elements 166, 168 and 170, and an adder 182 which adds the output signals of the delay elements weighted with a weighting factor $W_{M,1} \ldots W_{M,N}$.

The outputs of the time domain programmable filters 133, 135 and 137, carrying the processed audio signals, are connected to the combination means being here an adder 184. At the output of the adder 184 an enhanced audio signal is available. The output of the adder 184 is connected to inputs of time domain adaptive filters 191, 193 and 195.

The time domain adaptive filter 191 comprises a plurality of delay elements 194, 196 and 198. The output signals of the delay elements 194, 196 and 198 are weighted with weighting factors $W_{1,1} \ldots W_{1,N}$ by weighting elements 200, 202, 204, 206 and 208. The output signals of the weighting elements 200 . . . 208 are added by an adder 192 which provides the output signal of the adaptive filter 191.

The time domain adaptive filter 193 comprises a plurality of delay elements 226, 228 and 230. The output signals of the delay elements 226, 228 and 230 are weighted with weighting factors $W_{2,1} \ldots W_{2,N}$ by weighting elements 216, 218, 220, 222 and 224. The output signals of the weighting elements 216 . . . 224 are added by an adder 210 which provides the output signal of the adaptive filter 193.

The time domain adaptive filter 195 comprises a plurality of delay elements 236, 240 and 246. The output signals of the delay elements 236, 240 and 246 are weighted with weighting factors $W_{M,1} \ldots W_{M,N}$ by weighting elements 234, 238, 242, 244 and 248. The output signals of the weighting elements 234 . . . 248 are added by an adder 232 which provides the output signal of the time domain adaptive filter 195.

The outputs of the delay elements 186, 188 and 190 are connected to first inputs of subtractors 212, 214 and 230. The delay elements 186, 188 and 190 are present to make the impulse response of the programmable filters relatively anti-causal (earlier in time. Second inputs of the subtractors 212, 214 and 230 are coupled to outputs of the time domain adaptive filters 191, 193 and 195. The outputs of the subtractors 212, 214 and 230 are connected to control means 231, 233 and 235 respectively. The control means are arranged to adjust the transfer function of the corresponding adaptive filter 191, 193 and 195 in order to minimize the power of the output signal of the corresponding subtractor.

The control means 231, 233 and 235 are arranged for adjusting the coefficients of the adaptive filters 191, 193 and 195 according to the following expression:

$$W_{j,k}(n+1)=W_{j,k}(n)+\mu \cdot y[n-k+1] \cdot e_j[n] \qquad (24)$$

In (24) $W_{j,k}(n)$ is the weight factor of the $k^{th}$ (k=1, 2, ... N) weighting element in the $j^{th}$ adaptive filter, $\mu$ is a adaptation constant and $e_j[n]$ is the difference between the output signal of the $j^{th}$ block delay element delaying the input signal and the output signal of the $j^{th}$ adaptive filter. $y_j[n-k+1]$ is the over k–1 sample periods delayed output signal of the audio processing arrangement. These signals y[n–k+1] are available at the output of the delay elements of the adaptive filters. Because the adaptive filters all have the same input signals, the delay elements can be shared leading to a reduction of the required number of delay elements.

After the coefficients $W_{j,k}(n)$ have been determined, these coefficients are reversely passed to the time domain programmable filters 133, 135 and 137. This means that the coefficients corresponding to the first taps in the adaptive filters are passed to coefficients of the last taps in the corresponding programmable filter.

The functions representing the impulse responses are here the sets of coefficients $W_{1,1}, \ldots W_{1,N}; \ldots W_{M,1}, \ldots W_{M,N}$. As explained before, these functions representing the impulse responses are passed to the correlation function correlation means 7.

What is claimed is:

1. A signal source localization arrangement comprising:
   at least three receivers having different positions;
   delay difference estimation means for estimating a delay difference between signals received by at least two receivers; and
   position determining means for determining from the delay difference a signal source location;

impulse response determining means for determining a plurality of functions representing impulse responses of paths between the signal source and the at least two receivers, wherein the delay estimation means is arranged for determining the delay difference from the plurality of functions and wherein the impulse response determining means comprises adjustable filters for deriving filtered signals from the signals provided by the receivers, the signal source localization arrangement comprising combining means for deriving a combined signal from the filtered signals, in that the impulse response determining means comprises control means for controlling the adjustable filters in order to maximize a power measure of the combined signal, and in that the control means are arranged for limiting a combined power gain measure of the filtered signals to a predetermined value.

2. The signal source localization arrangement according to claim 1, wherein the delay estimation means is arranged for determining the delay difference by calculation of a correlation function from the plurality of functions.

3. The signal source localization arrangement according to claim 1, wherein the control means comprise a plurality of further adjustable filters having a transfer function being the conjugate of the transfer function of the adjustable filters, said further adjustable filters being arranged for deriving from the combined audio signal filtered combined audio signals, and in that the control means are arranged for maximizing the power measure of the combined signal, and for restricting a combined power gain measure of the processed signals to a predetermined value by controlling the transfer functions of the adjustable filters and the further adjustable filters in order to minimize a difference measure between the input signals and the filtered combined signal corresponding to said input signals.

4. A device comprising:
delay estimation means for estimating a delay difference between signals received by at least two receivers,: and impulse response determining means for determining a plurality of functions representing impulse responses of paths between a signal source and the receivers, wherein the delay estimation means determines a delay value from the plurality of functions, and wherein the impulse response determining means comprises adjustable filters for deriving filtered signals from the signals provided by the receivers, the signal source localization arrangement comprising combining means for deriving a combined signal from the filtered signals, in that the impulse response determining means comprises control means for controlling the adjustable filters in order to maximize a power measure of the combined signal, and in that the control means are arranged for limiting a combined power gain measure of the filtered audio signals to a predetermined value.

5. The delay estimation means according to claim 4, wherein the delay estimation means is arranged for determining the delay difference by correlating the plurality of functions.

6. The delay estimation means according to claim 4, wherein the control means comprises a plurality of further adjustable filters having a transfer function being the conjugate of the transfer function of the adjustable filters, said further adjustable filters being arranged for deriving from the combined audio signal filtered combined audio signals, and in that the control means are arranged for maximizing the power measure of the combined audio signal, and for restricting a combined power gain measure of the processed audio signals to a predetermined value by controlling the transfer functions of the adjustable filters and the further adjustable filters in order to minimize a difference measure between the input audio signals and the filtered combined audio signal corresponding to said input audio signals.

7. A video communication arrangement comprising:
camera pointing means for pointing a camera in a direction towards a signal source;

a plurality of receivers having different positions;

a signal source localization arrangement for determining a position of the signal source including delay estimation means for estimating a delay difference between the signals received by the receivers, and position determining means for determining from the delay difference a signal source location, impulse response determining means for determining a plurality of functions representing the impulse responses of the paths between the signal source and the receivers, wherein the delay estimation means is arranged for determining the delay value from the plurality of functions, wherein the impulse response determining means comprise adjustable filters for deriving filtered signals from the signals provided by the receivers, the signal source localization arrangement comprising combining means for deriving a combined signal from the filtered signal and the impulse response determining means comprises control means for controlling the adjustable filters in order to maximize a power measure of the combined signal, and in that the control means are arranged for limiting a combined power gain measure of the filtered audio signals to a predetermined value.

8. A signal source localization method using at least three receivers having different positions, comprising the steps of:
estimating a delay difference between the signals received by at least two receivers;

determining from the delay difference a signal source location;

determining a plurality of functions representing the impulse responses of the paths between the signal source and the receivers, by filtering the signals provided by the receivers and combining filtered signals, controlling the filtering in order to maximize a power measure of the combined signal, and limiting a combined power gain measure of the filtered signals to a predetermined value.; and determining the delay value from the plurality of functions.

\* \* \* \* \*